United States Patent
Conallen et al.

(10) Patent No.: US 8,001,519 B2
(45) Date of Patent: Aug. 16, 2011

(54) MODEL DRIVEN DEVELOPMENT INCLUDING ASPECT INTEGRATION TOOL

(75) Inventors: James Conallen, Souderton, PA (US); Eoin Lane, Littleton, MA (US); Harini Srinivasan, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 11/769,223

(22) Filed: Jun. 27, 2007

(65) Prior Publication Data

US 2009/0007084 A1    Jan. 1, 2009

(51) Int. Cl.
*G06F 9/44* (2006.01)
*G06F 9/45* (2006.01)

(52) U.S. Cl. .................................. 717/105; 717/109

(58) Field of Classification Search .......... 717/104–110, 717/114–116, 120–122
See application file for complete search history.

(56) References Cited

U.S. PATENT DOCUMENTS

| | | | | |
|---|---|---|---|---|
| 6,167,564 A * | 12/2000 | Fontana et al. | ............... | 717/104 |
| 6,199,195 B1 * | 3/2001 | Goodwin et al. | ............... | 717/104 |
| 6,601,234 B1 * | 7/2003 | Bowman-Amuah | .......... | 717/108 |
| 6,662,357 B1 * | 12/2003 | Bowman-Amuah | .......... | 717/120 |
| 6,874,146 B1 * | 3/2005 | Iyengar | ......................... | 719/313 |
| 6,968,535 B2 * | 11/2005 | Stelting et al. | ................ | 717/104 |
| 7,047,518 B2 * | 5/2006 | Little et al. | .................... | 717/108 |
| 7,099,809 B2 * | 8/2006 | Dori | .............................. | 703/6 |
| 7,137,100 B2 * | 11/2006 | Iborra et al. | .................. | 717/106 |
| 7,334,216 B2 * | 2/2008 | Molina-Moreno et al. | ... | 717/109 |
| 7,463,263 B2 * | 12/2008 | Gilboa | ........................ | 345/440 |
| 7,509,629 B2 * | 3/2009 | Sakamoto et al. | ............ | 717/105 |
| 7,526,503 B2 * | 4/2009 | Bernstein et al. | ..................... | 1/1 |
| 7,533,365 B1 * | 5/2009 | Hogstrom et al. | ............ | 717/105 |
| 7,562,346 B2 * | 7/2009 | Jhanwar et al. | ............... | 717/120 |
| 7,571,426 B2 * | 8/2009 | Carroll, Jr. | ..................... | 717/109 |
| 7,681,176 B2 * | 3/2010 | Wills et al. | ..................... | 717/109 |
| 7,712,073 B1 * | 5/2010 | Srinivasan et al. | ............ | 717/104 |
| 7,735,062 B2 * | 6/2010 | de Seabra e Melo et al. | | 717/120 |
| 7,769,402 B2 * | 8/2010 | Cai et al. | ........................ | 455/517 |
| 2002/0023261 A1 | 2/2002 | Goodwin et al. | | |
| 2002/0147763 A1 | 10/2002 | Lee et al. | | |
| 2004/0044990 A1 | 3/2004 | Schloegel et al. | | |
| 2004/0111702 A1 | 6/2004 | Chan | | |
| 2005/0005261 A1 | 1/2005 | Severin | | |
| 2005/0071805 A1 | 3/2005 | Lauterbach et al. | | |

(Continued)

OTHER PUBLICATIONS

Alphonce et al, "Green: a pedagogically customizable round tripping UML class diagram eclipse plug in", ACM pp. 115-119, 2005.*

(Continued)

*Primary Examiner* — Anil Khatri
(74) *Attorney, Agent, or Firm* — Patents on Demand, P.A.; Brian K. Buchheit; Scott M. Garrett (57) ABSTRACT

The present invention discloses a software development tool that includes a model development interface, an aspect design tool, and a model transformation engine. The model development interface can permit a developer to graphically design at least one software model. The aspect design tool for the model development interface can be configured to permit a user to specify at least one aspect to be applied to a model of the model development interface. The model transformation engine can transform a model of the model development interface having at least one aspect defined via the aspect design tool into automatically generated aspect code integrated with base language code.

18 Claims, 4 Drawing Sheets

U.S. PATENT DOCUMENTS

2005/0262485 A1    11/2005    Plante
2006/0064667 A1    3/2006    Freitas

OTHER PUBLICATIONS

Bull et al, "Advanced widgets for eclipse", ACM OOPSLA, pp. 6-11, 2004.*

Ehrler et al, "Executing agent UML diagram", ACM AAMAS, pp. 904-911, 2004.*

Eysholdt et al, "Migrating a large modeliing environment from XML/UML to Xtest/GMF", ACM SPLASH, pp. 97-103, 2010.*

Suleiman et al, "Integrating of UML modeling and policy driven management of web service systems", IEEE PESOS, pp. 75-82, 2009.*

Bergenti et al, "A development toolkit to realize autonomous and inter operable agents", ACM Agents, 632-639, 2001.*

Conallen, J., et al., "Modeling With Aspects: An Introduction to Modeling With Aspects," IBM, DeveloperWorks, Jun. 27, 2006.

* cited by examiner

MODEL DRIVEN DEVELOPMENT INCLUDING ASPECT INTEGRATION TOOL

BACKGROUND

1. Field of the Invention

The present invention relates to the field of software development technologies and, more specifically, to a model driven development (MDD) software solution that includes an aspect integration tool.

2. Description of the Related Art

All modern software programming methodologies, including procedural programming and object-oriented programming methodologies, support some separation and encapsulation of concerns into single entities, where concerns represent any area of interest or focus. For example, procedures, packages, classes, and methods all help programmers encapsulate concerns into a single entity. Some concerns, referred to as cross-cutting concerns, defy these traditional forms of encapsulation by affecting (cross-cutting) multiple concerns. Aspect-oriented programming (AOP) is a software programming paradigm designed to handle cross-cutting concerns.

AOP is a relatively new technology, which is currently implemented by a variety of tools, the most common of which is AspectJ. Other tools used for implementing AOP include AspectWerkz, JBoss AOP, Spring AOP, AspectC++, and the like. All of these tools are designed to modularize cross-cutting concerns, such as authentication and transaction management. At the heart of each of the AOP tools is a join point model, which provides a means of identifying where the cross-cutting is happening.

At a minimum, a join point model defines conditions for AOP code to run in an execution environment, a means of specifying where in base code (the non-aspect part of a program) the AOP code is to run, and a means of specifying code to run at this specified point. Using AOP terminology, a join point is where the main program and the AOP code (or aspect) meet. A pointcut is a set of join points. Whenever the base code execution reaches one of the join points described in the pointcut, a piece of code associated with the pointcut, referred to as an advice, is executed. In AspectJ, an advice is able to run before, after, and around join points.

Currently, use of AOP principles requires a developer to learn semantics of an AOP language, a new style of programming, and to be knowledgeable about integrating that language with a coding structure in a base language. At present, this skill is a highly specialized one which few programmers possess. Further, early design decisions should be made to utilize non-intrusive AOP principles in lieu of traditional approaches to cross-cutting concerns, such as use of intrusive APIs or frameworks. Hence, an AOP knowledgeable designer needs to be involved early in a project and remain involved throughout the various project stages, else AOP required code can become a bottleneck impeding project progress.

What is needed is a software tool that enables software designers and developers who lack specialized knowledge of AOP languages and programming intricacies to implement AOP oriented designs and non-aspect code. Preferably, this tool will permit core business code to be designed and tested largely independent of aspect specific code so that software projects are not highly dependent upon an availability of programmers possessing specialized knowledge of AOP languages. No software tools adequate for this purpose are known to exist.

SUMMARY OF THE INVENTION

A software development tool that permits aspects to be defined in a software design model in accordance with an embodiment of the inventive arrangements disclosed herein. The software design tool can be part of a graphical integrated development environment (IDE). Further, the software design tool can be a model driven development (MDD) tool, which is able to automatically generate code in an Aspect Oriented Programming (AOP) language, such as AspectJ, at code transformation time. The aspect development tool can permit a set of aspect libraries to be developed and distributed to development teams for import, which permits adding an aspect to a particular project a simple matter of performing a couple of mouse clicks. Accordingly, a model developer using the disclosed software tool can specify which aspects they wish to incorporate into a model (i.e., a class diagram of a Unified Modeling Language model) and use the specified aspects in a software project without possessing specialized knowledge of AOP languages and programming intricacies.

The present invention can be implemented in accordance with numerous aspects consistent with the material presented herein. For example, one aspect of the present invention can include a software development tool that includes a model development interface, an aspect design tool, and a model transformation engine. The model development interface can permit a developer to graphically design at least one software model. The aspect design tool for the model development interface can be configured to permit a user to specify at least one aspect to be applied to a model of the model development interface. The model transformation engine can transform a model of the model development interface having at least one aspect defined via the aspect design tool into automatically generated aspect code integrated with base language code.

Another aspect of the present invention can include a model driven architecture (MDA) transformation engine that includes a set of programmatic instructions stored within a machine readable medium, which when read by the machine cause the machine to perform a set of steps. One of these steps is to identify a class diagram model that is bound to at least one aspect. The programmatic instructions can then direct the machine to transform the class diagram model into base code and aspect code, wherein the base code is interwoven with the aspect code. Other than binding the aspect to design model using a model development tool, no manual specification of join points or pointcuts for the aspect code can occur. That is, the MDA engine creates these join points based upon the class model annotated for aspects.

Still another aspect of the present invention can include a method for creating software solutions having interwoven aspect oriented programming (AOP) code. The method can include a step of establishing a design model for a software project using a software modeling application. A model object can be annotated to be associated with an aspect by using the software modeling application. The design model can be automatically transformed into source code. The source code can include base code and aspect code, wherein the aspect code is automatically interwoven with the base code.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
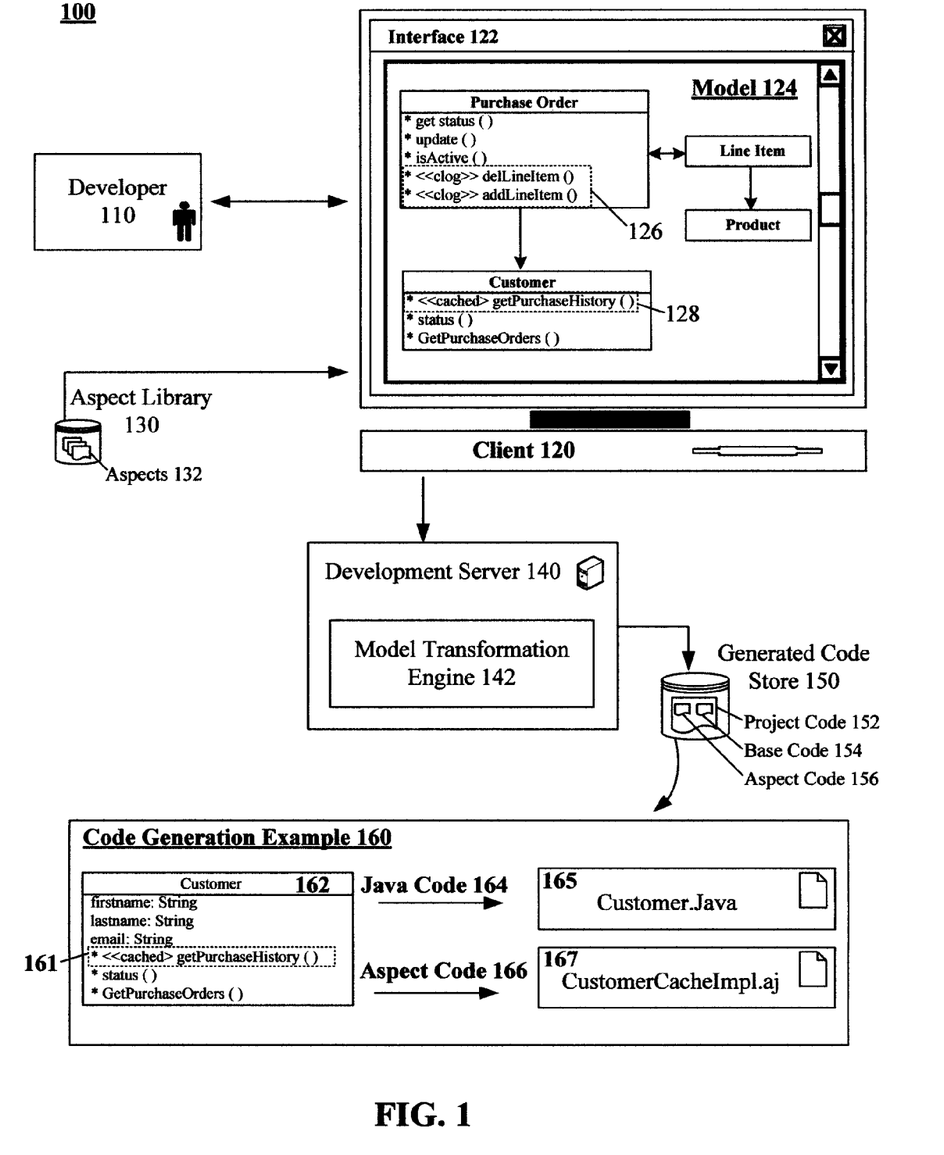
FIG. 1 is a schematic diagram of a software development system in which aspects can be specified in a design model and automatically transformed into aspect code in accordance with a model driven development (MDD) technology.

FIG. 1 is a schematic diagram of a software development system 100 in which aspects can be specified in a design model and automatically transformed into aspect code in accordance with a model driven development (MDD) technology. System 100 can include an interface 122 of a client 120 through which a software developer 110 can annotate 126, 128 an aspect within a software model 124. Each of the annotated 126, 128 aspects can be selected from an aspect library 130, containing one or more previously defined aspects 132. The annotated model 124 can be processed by a model transformation engine 142 of a development server 140. The transformation engine 142 can create project code 152 from the model 124 which is stored in data store 150. The project code 150 can include base code 154 for model elements and aspect code 156 interwoven with the base code 154.

Code generation example 160 illustrates a sample scenario of system 100. In example 160, a customer class defined within a class diagram object 162 can be established in interface 122. For example, an annotation 161 can bind a cache aspect (130) from the aspect library 132 to a GetPurchaseHistory ( ) method of the customer class. The transformation engine 142 can be configured to generate JAVA code 164 for the customer 162 class, specifically a customer.java 165 source code file. The annotated class object 162 can also be processed by engine 142 to create aspect code 166, specifically a customerChacheImpl.aj 167 source code file.

In one embodiment, other base programming languages for the generated code 154 can be established by user configurable settings, to produce C++ code, C# code, UML Text, VISUAL BASIC code, and the like. Similarly, the produced aspect code 156 can be written in a variety of aspect oriented programming (AOP) languages including, but not limited to, AspectJ, AspectWerkz, JBoss AOP, Spring AOP, AspectC++, JAC, and the like. New transformation plug-ins and software modules can also be added to the engine 142 to extend available languages for the base code 154 and/or aspect code 156.

The software model 124 can be any of a variety of models conforming to a modeling standard supported by a software driven engineering development system 140. The modeling standards can include the Unified Modeling Language (UML), the Meta-Object Facility (MOF), XML Metadata Interchange (XMI), Enterprise Distributed Object Computing (EDOC), the Software Processing Engineering Metamodel (SPEM), the Common Warehouse Metamodel (CWM), and the like. UML has been used for examples illustrated in the present document for simplicity of expression, but is not to be considered a limitation on the scope to the inventive arrangements disclosed herein.

In one implementation, the server 140 can define system functionality initially using a platform-independent model (PIM) using an appropriate domain specific language. A platform definition model (PDM), can then be used to translate the PIM to one or more extensible platform specific models (PSMs) using domain specific languages or general purpose languages, such as JAVA, C#, C++, PYTHON, AspectJ, and the like. In a different implementation, the server 140 can be designed to directly translate model 124 into a target language without necessarily using a PIM as a transformation intermediary.

The model 124 can be any of a variety of different types of diagrams which together define a software project and individually define artifacts for a software project. The type of diagrams represented by model 124 can include structure diagrams, behavior diagrams, and/or interaction diagrams. Structure diagrams can include, for example, a class diagram, a component diagram, a composite structure diagram, a deployment diagram, an object diagram, a package diagram, and the like. The behavior diagrams can include an activity diagram, a state machine diagram, a use case diagram, and the like. The interaction diagram can include a communication diagram, an interaction overview diagram, a sequence diagram, a timing diagram, and the like.

The development server 140 can include hardware and software components that are able to accept developer 110 created/edited models 124 and to transform the models 124 into project code 152. The development server 140 can be a server of an integrated development environment (IDE). The server 140 (together with software optionally hosted on client 120) can include a source code editor, a compiler and/or interpreter, a debugger, a version control system, modeling tools, and/or the like. In one embodiment, the development server 140 can support a multiple-language IDE, such as ECLIPSE. More specifically, the server 140 can provide AspectJ Development Tools (AJDT), such as those provided by IBM RATIONAL ROSE and RATIONAL SOFTWARE ARCHITECT. The invention is not limited in this regard and other IDE tools, such as those by JBOSS, AspectWerkz, and Spring, can be utilized with the inventive arrangements described herein.

The client 124 can include any computing device through which a developer 110 is able to interact to create/edit the model 124. In one embodiment, the client 120 can include a Web browser which renders Web pages served by a remote server (140) which are used to construct model 124. In another embodiment, the client 120 can include stand-alone software development software which can generate model 124 in a stand-alone fashion. In such an embodiment, components attributable to server 140, such as the model transformation engine 142, can be included in the client 120. Accordingly, depending on implementation specifics, the client 120 can be a server, a personal computer, a notebook computer, a Web terminal, a mobile computing device, a thin client, and the like.

The aspect library 130 and generated code store 150 can be data stores able to store digitally encoded information. The data stores can each be a physical or virtual storage space configured to store digital information. The data stores can be physically implemented within any type of hardware including, but not limited to, a magnetic disk, an optical disk, a semiconductor memory, a digitally encoded plastic memory, a holographic memory, or any other recording medium. The data stores can be a stand-alone storage unit as well as a storage unit formed from a plurality of physical devices. Additionally, information can be stored within the data stores in a variety of manners. For example, information can be stored within a database structure or can be stored within one or more files of a file storage system, where each file may or may not be indexed for information searching purposes. Further, data stores can optionally utilize one or more encryption mechanisms to protect stored information from unauthorized access.

The client 120 can optionally connect to the development server 140 over a network (not shown). Similarly, the development server 140 can comprise multiple geographically distributed components which are each connected to each other via a network connection (not shown). The network can include any hardware/software/and firmware necessary to convey digital content encoded within carrier waves. Content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Figure 2:
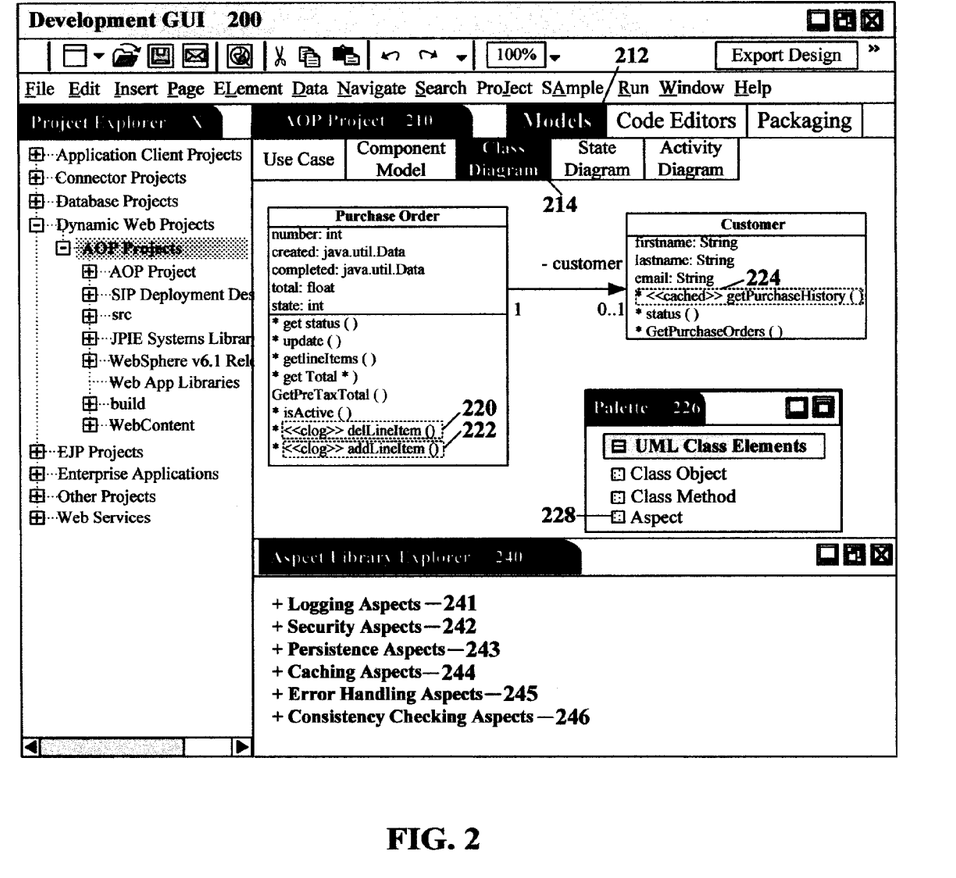
FIG. 2 illustrates a software development interface which permits aspects to be linked to model elements in accordance with an embodiment of the inventive arrangements disclosed herein.

FIG. 2 illustrates a software development interface 200 which permits aspects to be linked to model elements in accordance with an embodiment of the inventive arrangements disclosed herein. The development interface 200 can be an interface for creating/editing a software model used to automatically generate code that includes aspects interwoven with base code, as detailed in system 100. The interface 200 can be an interface for an IDE, such as an IDE for RATIONAL ROSE, RATIONAL SOFTWARE ARCHITECT, an ECLIPSE IDE, and/or other software design/development interfaces.

The tools of the software development application represented by interface 200 can facilitate visual modeling of systems at different levels of abstraction, such as a use case view, an analysis view, and/or a design view. A use case view can provide a textual description of a use case for a project. The analysis view can provide a sequence diagram and class diagrams of a reservation entity and a controller class (for entity management). The design view can contain a class diagram with entity enterprise JAVA BEANS (EJBs) and stateless session facades, depending on the non-functional requirements of the use case. Design model code can be generated from the model using a UML2JAVA, a UMLEBJ, a UML2Text, a UML2C++, or any other transformation, which a transformation engine (e.g., engine 142 of system 100) is configured to handle.

GUI 200 provides a software tool for managing AOP projects 210. The GUI 200 can include a number of selectable tools, such as model editors 212, code editors, debugging tools, packing tools, and the like. The model tools can include many different types of models, such as structure diagrams, behavior diagrams, and interaction diagrams. The structure diagrams can include a class diagram 214 modeling tool, which is shown for GUI 200.

The class diagram 214 can permit a user to specify class objects, such as a purchase order object and a customer object. A tool palette 226 for the canvas used to model the class diagram can include an aspect 228 tool. The aspect tool can be used to annotate a method 220, 222, and/or 224 with an aspect. The aspects are a noninvasive solution to addressing cross-cutting concerns. The concern specific behavior specified by the aspect is distinct from the core business functionality of an object which permits the cross-cutting concern to be handled in relative isolation. This approach is superior to conventional approaches that involve intrusive application program interfaces (APIs) or frameworks, which are possibly introduced with IDE/automation tools. Use of intrusive APIs can lead to difficult to maintain code and focus a developer away from core business concerns.

After being annotated 220-224, the needed aspects can be created by a developer skilled in AOP intricacies. The core code can be created and tested, without being concerned for the AOP code which can be integrated when available. In another embodiment, aspect developers can pre-develop a set of aspects that are used to create an aspect library 240. When an aspect library 240 exists, these aspects can be selected and automatically added to annotated methods 220-224. The aspect library can include selectable logging aspects 241, security aspects 242, persistence aspects 243, caching aspects 244, error handling aspects 245, consistency checking aspects 246, and the like.

Figure 3:
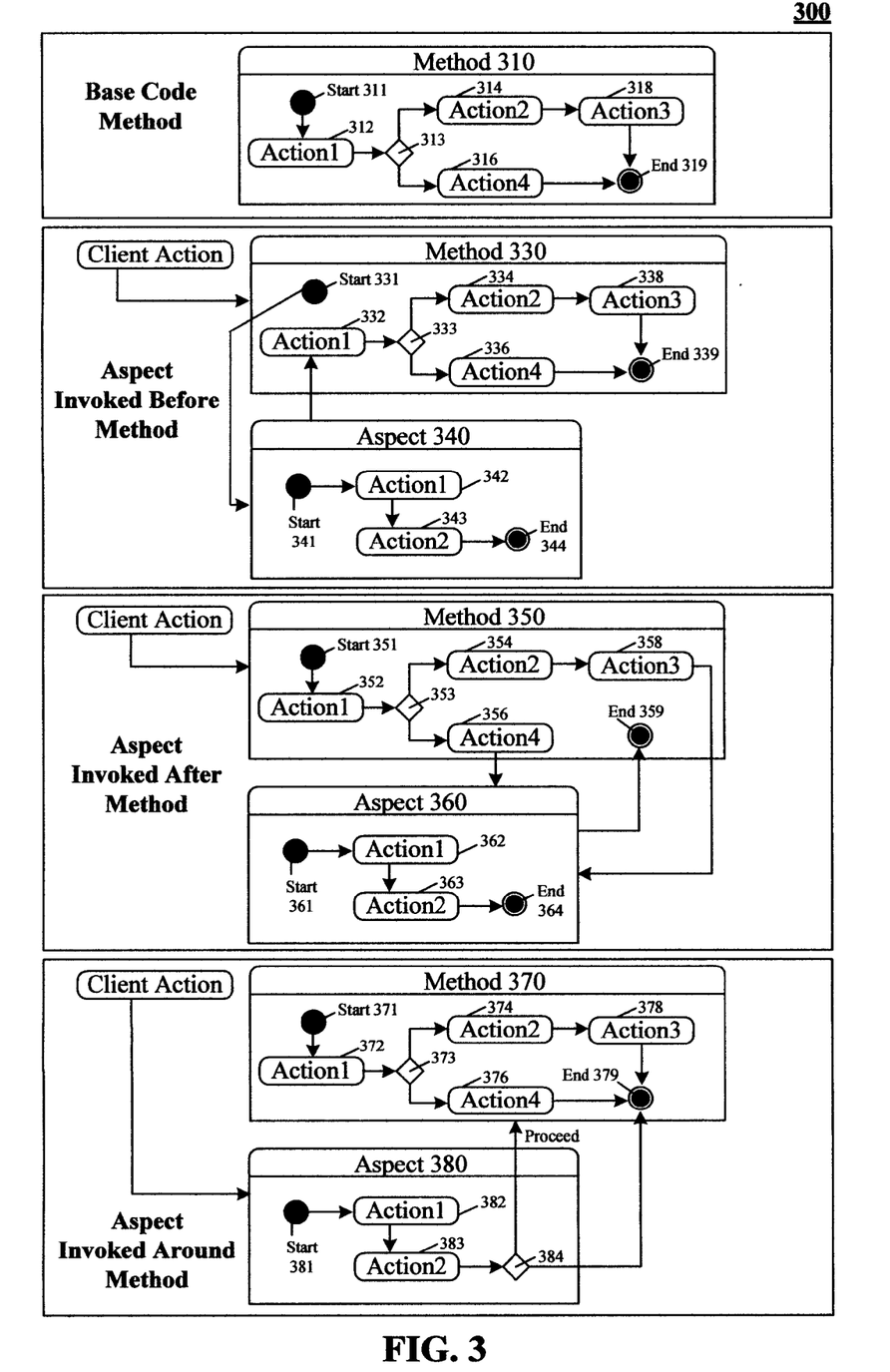
FIG. 3 is an activity diagram for integrating an aspect into a method of a base code module in accordance with an embodiment of the inventive arrangements disclosed herein.

FIG. 3 is an activity diagram 300 for integrating an aspect into a method of a base code module in accordance with an embodiment of the inventive arrangements disclosed herein. The activity diagram 300 can be a diagram presented by a software development GUI 200 after an aspect has been linked to a class diagram object. Diagram 300 permits a user to specify whether an aspect's functionality is inserted into an overall flow before an object's method is called, after the object's method is called, or around the method call. The diagram 300 can be part of an IDE tool able to dynamically generate code from a user created model. In one embodiment, the diagram 300 can be an interface presented to a developer 110 of system 100.

The method 310 of diagram 300 shows a dynamic flow of a method, which can be a method of a core program, such as a method of a class that is specified by a class diagram object. The method 310 can, for example, be a method (220, 222, 224) of GUI 200 annotated for aspect inclusion. The method starts at flow point 311, which executes action 312 (labeled Action1). After action 312, a decision point 313 can occur, which causes processing to branch to either action 314 (labeled Action2) or action 316 (labeled Action4). Execution of action 318 (labeled Action3) follows execution of action 314. An exit processing point 319 follows execution of either action 316 or action 318. The method 310 is repeated in subsequent figures, which show how an aspect can be bound to the method 310 in various ways.

The first integration diagram, shows how an aspect 340 can be involved before the method 330 is invoked. A start flow point 331 can be bound to aspect 340, having an initial execution start point 341. The execution flow proceeds from point 341 to action 342 and then to action 343. An exit point 344 follows action 343, which directs execution to action 332 of method 330. The method 330 actions proceed from action 332 to 336 to exit point 339 or from action 332, 334, 338, to 339 depending on how flow proceeds from the decision point 333 of method 330.

The second integration diagram shows how an aspect 360 can execute after a related method 350 executes. Method 350 starts at point 351, which progresses to action 352 and on to a decision point 353. Depending on values present at this decision point, action 354 can execute followed by action 358, from which aspect 360 is executed. Action 356 can also be triggered from by the decision point, where action 356 calls the aspect 360. The aspect 360 can start 361 execution and progress from action 362, to action 363, then to an end point 364. Execution can return from the aspect 360 to the end point 359 of method 350, where a program's execution can proceed as normal from there.

The third integration diagram shows how an aspect 380 can be integrated with method 370 and used to selectively bypass the method 370 execution. As shown, the aspect 380 can be triggered from a remote action which causes start point 381 to execute, followed by action 382, then action 383. An intra-aspect 380 decision point 384 can be specified that establishes a condition for either proceeding on to method 370 or to skip to execution point 379, which occurs at an end of method 370 processes. When flow proceeds from decision point 384 to the start 371 of method 370, processing can proceed through to action 372 to an intra-method 370 decision point 373. Processing can proceed from this decision point to either action 376 then to end point 379 or to action 374 to action 378 then to end point 379.

The flow processes illustrated in diagram 300 can be interactively established using a software modeling interface. Code can be automatically generated based upon model details illustrated by the diagram 300. For example, diagram 300 details can be used for defining join points or pointcuts used for weaving the base code with aspect code when the model is transformed into computing language source code. A model creator can be permitted to specify join point details between the aspect code and base code in an intuitive fashion using typical modeling mechanisms without being required to know AOP programming intricacies.

As demonstrated, the model creator can connect aspect code for execution before or after base code. Further, condition points can be specified for comparing a current system state with previously defined criteria to permit selective branching to/from the aspect code. This was demonstrated by decision point 384 of aspect 380 which selectively branches to different action points of method 370. Similar decision points (not shown) can be established within a base code method (specified by a model object) to selectively branch to user definable points of the aspect model object which corresponds to points in aspect specific code.

It should be appreciated that the specification mechanisms and interface details shown within interface 200 and by diagram 300 are for illustrative purposes to demonstrate how aspects can be specified via a modeling interface in such a manner that code can be automatically generated from the models. Other types of diagrams conforming to different modeling artifacts and modeling standards can be used for similar purposes to those of interface 200 and diagram 300. Further, other interface elements, arrangements, and layouts can be used other than those shown in the interface 200 or diagram 300 to accomplish the purposes of the disclosed invention. Consequently, the present invention should not be construed as limited to the precise arrangements and instrumentalities shown in FIGS. 2 and 3 and any of a variety of other interface artifacts, modeling elements and techniques, and the like known in the art can be utilized in conjunction with the inventive arrangements disclosed herein.

Figure 4:
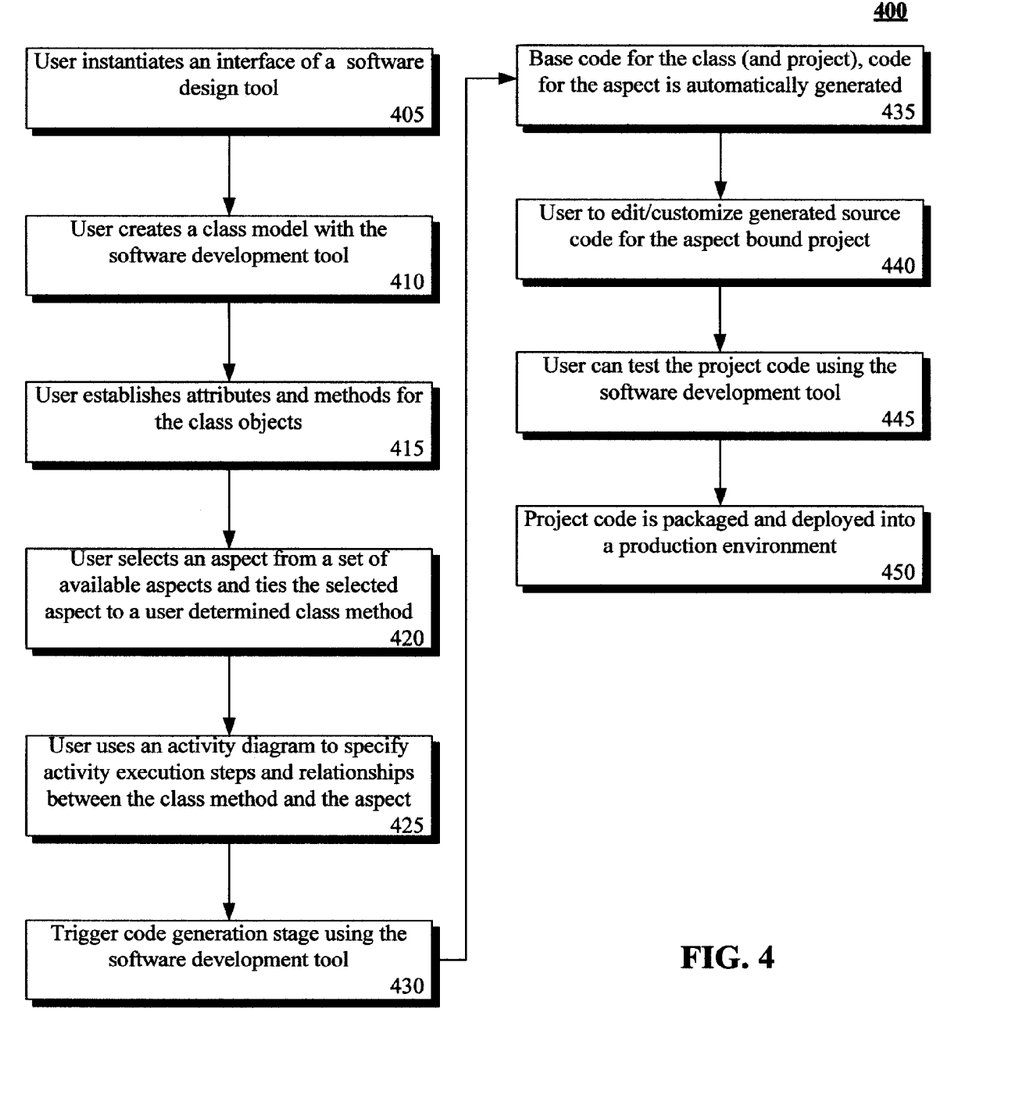
FIG. 4 is a flow chart of a model driven development method able to specify aspects in model objects and able to generate AOP code in accordance with an embodiment of the inventive arrangements disclosed herein.

FIG. 4 is a flow chart of a model driven development method 400 able to specify aspects in model objects and able to generate AOP code in accordance with an embodiment of the inventive arrangements disclosed herein. The method 400 can be performed in the context of a system 100 or similar computing environment.

The method 400 can begin in step 405, where a user initiates an interface of a software design tool. The software design tool can be an IDE tool, such as a RATIONAL or an ECLIPSE product. In step 410, a user can create or edit a class model with the software development tool. In step 415, the user can establish attributes and methods for the class objects of the created model. In step 420, a user can select an aspect from a set of available aspects which can be previously created aspects that are not yet bound to join points of a base software application with which the aspect is to be interwoven. In step 425, a user can use an activity diagram or other dynamic diagram to specify activity execution steps and relationships between the class method and the aspect. In one implementation, the binding details of how the aspect is to be integrated can be specified by non-graphical tools. For example, a user can select from a pull-down list whether the aspect is to execute before or after a method to which it is associated.

In step 430, a code generation stage can be invoked using the software design tool. In step 435, base code for the class and bound aspect can be automatically generated as well as other project code based upon the model using a transformation engine. In step 440, a user can edit/customize the generated source code for the aspect bound project. In step 445, the user can test the project code using the software development tool. In step 450, the project code can be compiled/optimized, packaged, and deployed into a production environment.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. A software development tool implemented as a program for controlling computing equipment, wherein said program is stored in a non-transitory storage medium, said software development tool comprising:
   a model development interface implemented in a program that controls computing equipment, wherein said program is stored in a non-transitory storage medium, wherein said model development interface is configured to permit a developer to graphically design at least one software model;
   an aspect design tool implemented as a program for controlling computing equipment, wherein said program is stored in a non-transitory storage medium, wherein said aspect design is for the model development interface configured to permit a user to specify at least one aspect to be applied to a model of the model development interface;
   a model transformation engine implemented as a program for controlling computing equipment, wherein said program is stored in a non-transitory storage medium, wherein said aspect design is configured to transform a model of the model development interface having at least one aspect defined via the aspect design tool into automatically generated aspect code integrated with base language code; and
   an invocation specification tool implemented as a program for controlling computing equipment, wherein said program is stored in a non-transitory storage medium, wherein said invocation specification tool is configured to graphically indicate when the aspect specified by the aspect design tool is to be invoked relative to when a model object to which the aspect is integrated is to be invoked, wherein the model transformation engine interweaves the base code and the aspect code based upon selections made via the invocation selection tool.

2. The software development tool of claim 1, wherein the design model is a class diagram, wherein the aspect design tool permits aspects to be bound to a class method graphically shown in the model development interface.

3. The software development tool of claim 1, wherein the at least one software model is an aspect annotated Unified Modeling Language (UML) model that is platform independent, wherein the base language code is written in platform specific language, and wherein the generated aspect code is written in an aspect language that corresponds to the platform specific language.

4. The software development tool of claim 1, further comprising:
   an aspect library stored in a non-transitory storage medium, said aspect library comprising a plurality of stored, previously generated, project independent aspects, wherein said aspect design tool is able to select any of the plurality of stored aspects and integrate the selected aspect to the model.

5. The software development tool of claim 1, wherein said software development tool is a computer-aided software engineering (CASE) tool supporting a Unified Modeling Language (UML), wherein the aspect design tool is implemented as a plug-in for the computer-aided software engineering (CASE) tool.

6. The software development tool of claim 5, wherein the computer-aided software engineering (CASE) tool is compliant with an ECLIPSE based open standard.

7. A model driven architecture (MDA) transformation engine comprising:
   a set of programmatic instructions stored within a non-transitory machine readable storage medium, which when read by the machine cause the machine to perform the steps of:
   graphically presenting the design model using a software modeling application;
   identifying a class diagram model that is bound to at least one aspect;
   graphically indicating, at least one pointcut for the aspect using the software modeling application, wherein the aspect code is automatically interwoven in accordance with the pointcut; and
   transforming the class diagram model into base code and aspect code, wherein the base code is interwoven with the aspect code, wherein other than binding the aspect to design model using a model development tool, no manual specification of join points or pointcuts for the aspect code occurs.

8. The engine of claim 7, wherein the aspect is bound to a class method of the class diagram model which conforms to a Unified Modeling Language (UML) standard, wherein said class diagram model is platform independent, and wherein the base code is written in platform specific language, and wherein the aspect code is written in an aspect language that corresponds to the platform specific language.

9. The engine of claim 7, wherein the platform specific language is JAVA, and wherein the aspect language is AspectJ.

10. The engine of claim 7, wherein set programmatic instructions further cause said machine to perform the step of:
    identifying a user created model that indicates when the aspect is to be invoked relative to when the model object is to be invoked, wherein the transforming step interweaves the base code and the aspect code in accordance with the identified indications from the user created model.

11. A method for creating software solutions having interwoven aspect oriented programming (AOP) code comprising:
    establishing, via computing equipment executing at least one program stored in a non-transitory storage medium, a design model for a software project using a software modeling application;
    graphically presenting, via computing equipment executing at least one program stored in a non-transitory storage medium, the design model using the software modeling application;
    annotating, via computing equipment executing at least one program stored in a non-transitory storage medium, a model object as being associated with an aspect using the software modeling application; and
    graphically indicating, via computing equipment executing at least one program stored in a non-transitory storage medium, at least one pointcut for the aspect using the software modeling application, wherein the aspect code is automatically interwoven in accordance with the pointcut;
    automatically transforming, via computing equipment executing at least one program stored in a non-transitory storage medium, the design model into source code, said source code comprising base code and aspect code, wherein the aspect code is automatically interwoven with the base code.

12. The method of claim 11 wherein said steps of claim 11 are steps performed automatically by at least one machine in accordance with at least one computer program having a plurality of code sections that are executable by the at least one machine, said at least one computer program being stored in a non-transitory machine readable storage medium.

13. The method of claim 11, further comprising:
presenting, via computing equipment executing at least one program stored in a non-transitory storage medium, a plurality of previously coded aspects in an unbound form within the software modeling application; and
including, via computing equipment executing at least one program stored in a non-transitory storage medium, in the software modeling interface selectable controls for choosing one of the plurality of previously coded aspects to be the aspect associated with the model object in the annotating step.

14. The method of claim 11, further comprising:
selecting, via computing equipment executing at least one program stored in a non-transitory storage medium, when the aspect is to be invoked relative to when the model object is to be invoked, wherein the selecting step is performed within the software modeling application, wherein the transforming step interweaves the base code and the aspect code in accordance with choices made in the selecting step.

15. The method of claim 14, further comprising:
graphically selecting, via computing equipment executing at least one program stored in a non-transitory storage medium, when the aspect is to be invoked, wherein selection options of the graphically selecting step comprise an option to invoke the aspect before code of the model object and an option to invoke the aspect after code of the model object.

16. The method of claim 14, further comprising:
establishing, via computing equipment executing at least one program stored in a non-transitory storage medium, a decision point associated with the aspect, wherein a set of conditions are to be evaluated at the decision point, wherein when the conditions are evaluated in one manner code of the model object is invoked, and wherein when the conditions are evaluated in a different manner code of the model object is bypassed.

17. The method of claim 14, further comprising:
establishing, via computing equipment executing at least one program stored in a non-transitory storage medium, a decision point with the model object, wherein a set of conditions are to be evaluated at the decision point, wherein when the conditions are evaluated in one manner code of the aspect is executed, and wherein when the conditions are evaluated in a different manner aspect code is bypassed.

18. The method of claim 11, wherein the design model is a class diagram, wherein the model object to which the aspect is annotated is a method of a class object.

* * * * *